United States Patent
Mary et al.

(10) Patent No.: US 12,078,295 B2
(45) Date of Patent: Sep. 3, 2024

(54) CONTAINER FOR PRESSURIZED FLUID WITH ELECTRONIC DEVICE FOR CALCULATING REMAINING FLUID

(71) Applicant: L'Air Liquide Société Anonyme pour l'Etude et l'Exploitation des Procédés Georges Claude, Paris (FR)

(72) Inventors: Alexis Mary, Boulogne-Billancourt (FR); Bertrand Morin, Alfortville (FR); Valerie Pateau, Antony (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 239 days.

(21) Appl. No.: 17/714,339

(22) Filed: Apr. 6, 2022

(65) Prior Publication Data
US 2022/0316657 A1    Oct. 6, 2022

(30) Foreign Application Priority Data

Apr. 6, 2021 (FR) ........................ 2103506

(51) Int. Cl.
*F17C 13/02* (2006.01)
*F17C 1/00* (2006.01)
(Continued)

(52) U.S. Cl.
CPC .............. *F17C 13/025* (2013.01); *F17C 1/00* (2013.01); *F17C 13/026* (2013.01); *F17C 13/04* (2013.01);
(Continued)

(58) Field of Classification Search
CPC ........ F17C 13/025; F17C 1/00; F17C 13/026; F17C 13/04; F17C 2201/0119;
(Continued)

(56) References Cited

U.S. PATENT DOCUMENTS 4,876,903 A * 10/1989 Budinger .............. F17C 13/003
128/204.22
2004/0112435 A1* 6/2004 Olander ............... G05D 7/0652
137/487.5
(Continued)

FOREIGN PATENT DOCUMENTS

CN 104039431 A * 9/2014 .............. A23L 2/54
EP 0916891 A2 * 5/1999 .............. F17C 13/04
(Continued)

OTHER PUBLICATIONS

French Search Report for corresponding FR 2103506, Dec. 17, 2021.

*Primary Examiner* — Bob Zadeh
(74) *Attorney, Agent, or Firm* — Elwood L. Haynes

(57) ABSTRACT

The invention relates to a container (1) for pressurized fluid, in particular a gas cylinder, having a given internal volume (2), having a fluid distribution valve (3) having a member for selecting the flow rate (12) able to adopt a plurality of distinct positions each corresponding to a given fluid flow rate, and an electronic device (7) having means for measuring pressure, microprocessor (15)-based data processing means (5) for processing the pressure measurements, and display means (6) for displaying the remaining fluid calculated by the data processing means (5).

10 Claims, 2 Drawing Sheets

(51) Int. Cl.
  *F17C 13/04* (2006.01)
  *G01F 22/02* (2006.01)
(52) U.S. Cl.
  CPC ...... *G01F 22/02* (2013.01); *F17C 2201/0119* (2013.01); *F17C 2201/032* (2013.01); *F17C 2201/058* (2013.01); *F17C 2205/0323* (2013.01); *F17C 2205/0394* (2013.01); *F17C 2221/011* (2013.01); *F17C 2250/032* (2013.01); *F17C 2250/043* (2013.01); *F17C 2250/0439* (2013.01); *F17C 2250/0443* (2013.01); *F17C 2270/02* (2013.01)
(58) Field of Classification Search
  CPC .......... F17C 2201/032; F17C 2201/058; F17C 2205/0323; F17C 2205/0394; F17C 2221/011; F17C 2250/032; F17C 2250/043; F17C 2250/0439; F17C 2250/0443; F17C 2270/02; F17C 2203/0663; F17C 2205/0188; F17C 2205/0308; F17C 2205/0329; F17C 2205/0338; F17C 2221/03; F17C 2250/0491; F17C 2270/025; F17C 13/02; F17C 2201/0109; F17C 2203/0639; F17C 2203/0646; F17C 2205/0165; F17C 2205/035; F17C 2221/014; F17C 2221/017; F17C 2221/031; F17C 2223/0123; F17C 2223/036; F17C 2225/0123; F17C 2225/036; F17C 2227/048; F17C 2250/036; F17C 2250/0473; F17C 2250/0478; F17C 2265/04; G01F 22/02

See application file for complete search history.

(56) References Cited

U.S. PATENT DOCUMENTS

| 2015/0260343 A1* | 9/2015 | Baune | F17C 1/00 206/0.6 |
| 2017/0002981 A1* | 1/2017 | Carron | F17C 13/04 |
| 2019/0162617 A1* | 5/2019 | Quattrone | F17C 13/026 |
| 2022/0316657 A1* | 10/2022 | Mary | F17C 1/00 |

FOREIGN PATENT DOCUMENTS

| EP | 2 918 892 | | 9/2015 |
| FR | 3 016 679 | | 7/2015 |
| FR | 3033385 | A1 * | 9/2016 |
| FR | 3044405 | A1 * | 6/2017 |
| FR | 3 050 053 | | 10/2017 |
| FR | 3 087 870 | | 5/2020 |

* cited by examiner

CONTAINER FOR PRESSURIZED FLUID WITH ELECTRONIC DEVICE FOR CALCULATING REMAINING FLUID

CROSS REFERENCE TO RELATED APPLICATIONS

This application claims the benefit of priority under 35 U.S.C. § 119 (a) and (b) to French Patent Application No. 2103506, filed Apr. 6, 2021, the entire contents of which are incorporated herein by reference.

BACKGROUND

The invention relates to a container for pressurized fluid, in particular a gas cylinder, typically for a medical gas, comprising a fluid distribution valve and an electronic device comprising means for measuring pressure for taking successive pressure measurements repeated at a given frequency and data processing means for determining a remaining fluid based on these successive pressure measurements.

Medical fluids or gases, such as oxygen, $NO/N_2$, $N_2O/O_2$, $He/O_2$ mixtures, medical air, etc., are generally contained in pressurized gas containers, such as gas cylinders or tanks, which are equipped with a distribution valve, which might or might not have an integrated pressure-regulating (IPR) system, used to supply the medical gas, and with a dial-type manometer or with an electronic device with a digital display for displaying the remaining gas pressure or a remaining gas. In general, a rigid protective covering, also called a "cap", is used to protect the valve and its fittings from impacts, dropping, dirt or the like.

Thus, EP-A-2918892 proposes a gas cylinder equipped with an integrated pressure regulator (IPR) and with an electronic device with a digital display screen.

An electronic device for a container for pressurized fluid generally comprises pressure and temperature sensors, as well as a processor and a display screen for calculating and displaying, in particular, the remaining gas volume, the gas pressure and the remaining gas available, which vary in particular according to the flow rate of gas delivered by the valve.

For example, reference may be made to FR-A-3050053, FR-A-3087870 and FR-A-3016679 which describe gas cylinders equipped with electronic devices for providing information on remaining fluid, pressure and the like.

In practice, it is observed that the remaining fluid displayed is often inaccurate or fluctuates, i.e. the displayed remaining fluid values regularly go up or down. Such inaccuracy leads, for example, to the remaining fluid decreasing by given periods of time, for example every hour or every 10 minutes, which results in some degree of uncertainty for the user and/or a low level of confidence.

This is not satisfactory because, in a medical environment, a user expects to see the remaining fluid decrease minute by minute, i.e. to be able to benefit from more accurate and more reliable information.

However, this inaccuracy is due to a number of effects which may build up, in particular the accuracy of the pressure sensor which may exhibit measurement variations of up to 100 mbar for two identical measurements, to temperature effects, such as the gas expanding during use, to restrictions on power consumption, to the reactiveness of the display desired by the user (e.g. displaying in less than a second), to the use of low flow rates (e.g. a few litres a minute leads to a small drop in pressure, comparable to the inaccuracy of the sensor), and to substantial filling of the container.

All of these effects exacerbate the difficulty in calculating and providing a more reliable and more accurate remaining fluid value, for example one that decreases minute by minute.

In other words, one problem is therefore to be able to more accurately calculate and to more reliably display, on the digital display screen, the remaining fluid value for a fluid container, in particular a gas cylinder, especially a medical oxygen cylinder, fitted with a gas distribution valve and an electronic device with a digital display screen.

SUMMARY

One solution according to the invention relates to a container for pressurized fluid, in particular a gas cylinder, having a given internal volume, comprising a fluid distribution valve comprising:
  a member for selecting the flow rate able to adopt a plurality of distinct positions each corresponding to a given fluid flow rate between 0 and 30 L/min, said member for selecting the flow rate being able to be manipulated by a user in order to select a desired flow rate,
  and an electronic device comprising:
    means for measuring pressure in order to measure the pressure of the fluid contained in the fluid container,
    microprocessor-based data processing means for processing at least some of the pressure measurements taken by the means for measuring pressure and calculating a remaining fluid, and
    display means for displaying the remaining fluid calculated by the data processing means,
  characterized in that:
    the means for measuring pressure are configured to take a plurality of successive pressure measurements ($P_1 \ldots P_n$), said successive pressure measurements ($P_1 \ldots P_n$) being repeated at a given frequency (F) between 5 and 300 seconds, and
    the data processing means are configured to determine the remaining fluid based on said pressure measurements ($P_1 \ldots P_n$) measured by the means for measuring pressure at the given frequency (F) and at least one additional parameter chosen from among the position of the member for selecting the flow rate, the temperature of the fluid and the volume of the fluid container.

Depending on the embodiment under consideration, the container for pressurized fluid of the invention may comprise one or more of the following features:
  said successive pressure measurements ($P_1 \ldots P_n$) are repeated at a given frequency (F) over a period of time (dt).
  the period of time (dt) is several days, several weeks, several months or several years.
  said successive pressure measurements ($P_1 \ldots P_n$) are repeated at a given frequency (F) without interruption, i.e. taken continuously regardless of whether or not the container is in use, for example in storage.
  said successive pressure measurements ($P_1 \ldots P_n$) are repeated at a given frequency (F) between 5 and 150 seconds, preferably between 5 and 90 seconds, more preferably between 5 and 30 seconds.
  the member for selecting the flow rate is configured to adopt distinct positions corresponding to fluid flow rates between 0 and 25 L/min.

it comprises at least one position sensor configured to determine the position of the member for adjusting the flow rate.

it comprises at least one temperature sensor configured to measure the temperature of the fluid.

the given volume of the fluid container is stored by the data processing means, in particular by the microprocessor or storage means, and preferably the given volume of the fluid container is between 1 L and 20 L.

the data processing means are configured to determine the remaining fluid by determining at least one pressure variation (i.e. a slope of the pressure drop) based on successive pressure measurements ($P_1 \ldots P_n$) measured by the means for measuring pressure at the given frequency (F).

the member for selecting the flow rate comprises a rotary member, preferably a rotary handwheel, and the selectable positions are angularly offset positions.

More generally, the container for pressurized fluid of the invention may also comprise one or more of the following additional features:

it comprises a combined pressure and temperature sensor.

the one or more pressure and temperature sensors are in fluidic communication with an internal gas circuit of the fluid distribution valve so as to take the pressure and/or temperature measurements there.

the container comprises an internal volume for storing fluid between 1 and 20 L (water equivalent), preferably between 2 and 15 L (water equivalent).

the internal volume of the fluid container is stored by the data processing means, in particular by the microprocessor or storage means, for example an EEPROM or the like.

the data processing means are configured to process the position of the member for selecting the flow rate which is determined by said at least one position sensor in order to deduce therefrom the flow rate selected by the user.

the data processing means comprise a timer.

the one or more sensors are electrically connected to the data processing means in order to provide measurements (i.e. signals) of the pressure and/or of the temperature of the fluid to said data processing means.

the temperature sensor is configured to measure one or more temperatures between −40° C. and +70° C.

the data processing means comprise one or more microprocessors implementing one or more algorithms.

the circuit board is arranged in the electronic device.

the circuit board bears the one or more microprocessors.

the one or more microprocessors are configured to process the pressure and/or temperature measurements provided by the one or more pressure and temperature sensors.

the data processing means comprise the circuit board.

the data processing means comprise at least one microprocessor integrated in the form of a microcontroller.

the one or more microprocessors, in particular the one or more microcontrollers, are configured to save data, in particular within software or a dedicated algorithm.

the internal passage of the fluid distribution valve within which the fluid pressure and temperature measurements are taken is in fluidic communication with the internal volume of the gas container in which the pressurized fluid is stored, in particular pressurized gas.

the data processing means and the display means are supplied with electric current by an electric current source.

the one or more sensors are supplied with electric current by the or an electric current source.

the electric current source comprises one or more electric batteries or cells, which may or may not be rechargeable.

the one or more single pressure and/or temperature sensors comprises embedded electronics allowing the pressure and/or the temperature of the gas to be determined.

the combined pressure and temperature sensor comprises embedded electronics comprising membrane-based means for determining the pressure of the gas and temperature probe-based means for measuring the temperature of the gas.

the membrane-based means and the temperature probe-based means are arranged so as to be in contact with the gas conveyed by the internal passage in the sensor body, i.e. a single same gas duct.

the embedded electronics of the single pressure and temperature sensor are electrically connected to the data processing means in order to communicate signals and/or measured pressure and temperature values thereto.

the embedded electronics of the single pressure and temperature sensor comprise one or more additional microprocessors.

the electronic device is a digital manometer configured to display the pressure of the fluid, the volume of the fluid in the container and the flow rate of the gas delivered by the valve and also the remaining gas, i.e. duration of use with respect to the amount of fluid remaining in the container and/or to the flow rate at which the gas is delivered by the valve.

the display means of the electronic device comprise a digital display screen, also called a digital display, for example an LCD screen.

the fluid distribution valve comprises a delivery outlet connector or end fitting for delivering the fluid, typically a gas, in particular a medical gas, at the desired flow rate.

the fluid distribution valve comprises a fluid inlet orifice in fluidic communication with the internal gas circuit of the fluid distribution valve so as to allow pressurized fluid from the internal volume of the fluid container into the internal gas circuit of the fluid distribution valve.

the fluid inlet orifice of the fluid distribution valve is in fluidic communication with the internal volume of the fluid container.

the internal gas circuit of the fluid distribution valve fluidically connects the fluid inlet orifice of the distribution valve to the delivery outlet connector, in particular the delivery outlet connector to which is fluidically connected a device using or conveying the fluid, for example a medical device or a flexible duct.

the fluid distribution valve comprises a threaded attachment end fitting, i.e. an expansion, which is frustoconical or cylindrical in shape.

the threaded attachment end fitting of the distribution valve bears the fluid inlet orifice.

the container is a pressurized gas cylinder.

the gas cylinder comprises a neck bearing the fluid outlet orifice in fluidic communication with the interior of the gas cylinder, i.e. with the internal volume containing the pressurized gas.

the fluid outlet orifice of the gas cylinder is tapped.

the threaded attachment end fitting of the fluid distribution valve is screwed into the tapped neck of the gas cylinder.

the internal gas circuit of the fluid distribution valve is made in, for example drilled into, the body of the fluid distribution valve.

the delivery outlet connector of the fluid distribution valve is configured to be fluidically connected to a flexible gas duct or another device using the fluid, such as a medical device or apparatus.

the data processing means are arranged in a rigid housing for the electronic device.

the device for selecting the flow rate comprises a rotary handwheel configured to move between a plurality of positions that are angularly offset from one another, each position corresponding to a given desired gas flow rate value.

the device for selecting the flow rate comprises markings corresponding to the selectable desired gas flow rates.

the device for selecting the flow rate further cooperates with a device for adjusting the flow rate arranged in the body of the valve in order to adjust the flow rate to the desired gas flow rate value.

the device for adjusting the flow rate comprises a calibrated disc with orifices arranged in the path of the gas in the body of the valve.

the gas outlet connector is arranged at the centre of the rotary handwheel, i.e. they are arranged coaxially with one another.

the digital display of the electronic device is configured to various items of information of use to the user, in particular the remaining gas, a gas pressure, a gas volume, a gas flow rate or else an alert icon, for example a remainder alert or pipe restriction alert, etc., or other information or graphical representations, for example a graphic bar, etc.

the data processing means are configured to trigger a sound alert and a visual alert if an alert is triggered, in particular a restriction alert or a remaining fluid alert.

the electronic device further comprises data storage means.

the data storage means comprise a read-only memory, preferably an EEPROM or the like.

the data storage means are arranged on a circuit board, preferably on the circuit board bearing the microprocessor.

the electronic device is attached to the body of the gas distribution valve, in particular by screwing or using a pin-based system.

the electrical power source supplies power to the circuit board, the one or more microprocessors, and all of the components operating with electric current, such as the digital display, the pressure and temperature sensor and/or an alert LED.

the fluid distribution valve is protected by a protective covering comprising a rigid covering body arranged around said fluid distribution valve.

the electric current source is arranged in a compartment in the protective covering.

the housing for the electronic device comprising the digital display is accommodated in an opening made in the covering body.

the covering body defines an internal space dimensioned to accommodate the gas distribution valve.

the covering body is made of a polymer material, of metal or of combinations thereof.

the covering body comprises one or more carrying handles; preferably the carrying handle is arranged so as to surmount the covering, i.e. it is located substantially on top of the covering.

the gas distribution valve is a valve with an integrated pressure regulator or IPR, i.e. a valve including a fluid pressure-regulating system arranged on the internal circuit that conveys the fluid from the container to the outlet connector.

gas pressure regulation means are arranged on the internal gas circuit.

the gas pressure regulation means comprise a pressure-regulating valve and a valve seat. They allow the pressure of the gas to be reduced from the high pressure of the gas stored in the container, typically several tens to hundreds of bar, down to a lower, preset pressure of use, typically a few bar, for example from 2 to 5 bar abs.

the fluid distribution valve is made of copper alloy, such as brass.

the covering body further comprises a securing system designed to allow it to be secured to a support, in particular to a bar of a hospital bed or to a stretcher for carrying a patient or the like.

the covering body further comprises a movable, preferably pivoting, securing system.

the fluid container, when full, contains a gas at a pressure of at least 130 to 200 bar abs, typically more than 200 bar abs, or even at least 300 bar abs.

the container has a cylindrical, in particular ogival, general shape, made of metal or metal alloy (e.g. steel, aluminium, etc.) or of one or more composite materials.

the fluid container contains a gas or a mixture of gases, such as oxygen, an $NO/N_2$, $O_2/N_2O$ or $He/O_2$ mixture, air, or another medical gas.

The invention also relates to the use of a container according to the invention to store or to supply a pressurized gas, in particular a medical gas chosen from among oxygen or a gaseous mixture of $N_2O/O_2$, $NO/N_2$, $He/O_2$, or medical air.

BRIEF DESCRIPTION OF THE DRAWINGS

The invention will now be better understood from the following detailed description, which is given by way of non-limiting illustration, with reference to the appended figures, in which.

DETAILED DESCRIPTION OF PREFERRED EMBODIMENTS

Figure 1:
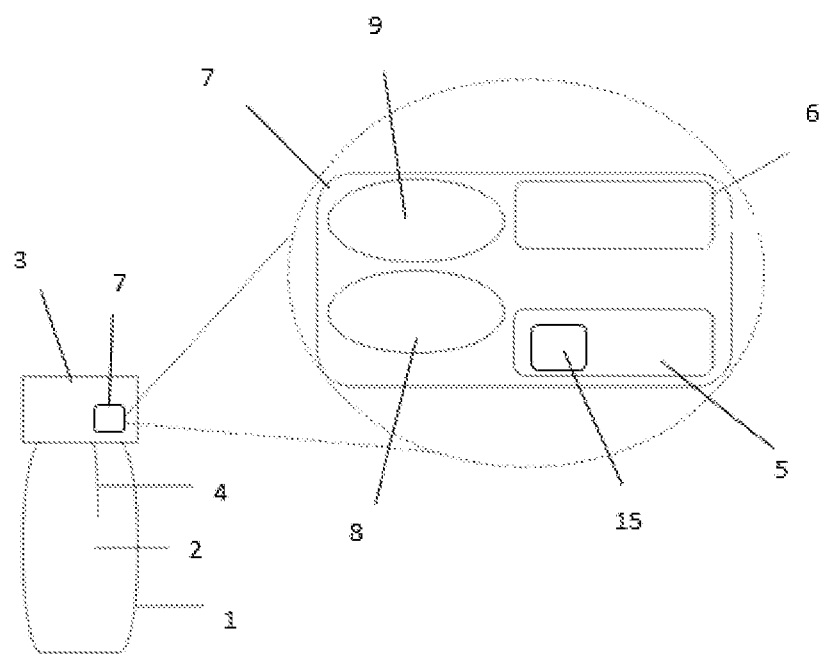
FIG. 1 is a schematic representation of a fluid container equipped with a gas distribution valve having an electronic device according to the invention.
Figure 2:
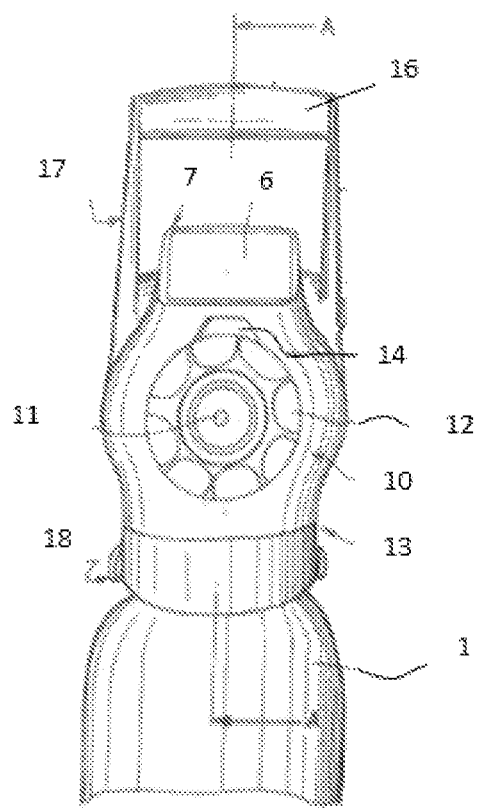
FIG. 2 shows one embodiment of a container of gas cylinder type for pressurized fluid according to the invention, and FIG. 3 schematically shows the successive pressure measurements at the given frequency taken by an electronic device of a fluid container according to the invention.

FIG. 1 is a schematic representation of a container 1 for pressurized fluid according to the invention, while FIG. 2 shows one embodiment of such a fluid container 1, namely here a pressurized gas cylinder, of axis AA.

More precisely, the fluid container 1 comprises an internal volume 2 for storing pressurized gas, for example at more than 200 bar abs (pressure when full), and is equipped with a fluid distribution valve 3, such as an IPR, through which passes an internal fluid passage or circuit (not shown) in fluidic communication with the internal volume 2 of the container 1 so as to convey the fluid, namely here gas, such as oxygen, within the body of the gas distribution valve 3 to a delivery outlet connector 11, visible in FIG. 2, to which is fluidically connected, for example, a flexible gas duct (not shown) or another device using the gas that is delivered.

The cylinder or container 1 for pressurized gas in FIG. 2 comprises a cylindrical body and a neck, i.e. it is ogival in shape. The cylindrical body defines the internal volume 2 for storing gas under pressure, typically a maximum pressure between 130 and 300 bar abs, or even beyond 300 bar abs. The neck comprises a fluid inlet/outlet orifice that is in communication with the internal volume 2 and allows the gas to be withdrawn from the internal volume 2 or, conversely, allows it to be filled when it is empty. The gas distribution valve 3 is mounted, typically screwed, at the level of the orifice in the neck of the gas cylinder.

The container 1 has a cylindrical general shape and is made of metal or metal alloy (e.g. steel, aluminium, etc.) or of one or more composite materials. It contains a gas or a mixture of gases, such as oxygen, an $NO/N_2$, $O_2/N_2O$ or $He/O_2$ mixture, air, or any other medical gas, typically medical oxygen.

The gas distribution valve 3, which is here an IPR including internal regulation means, is screwed, via an expansion or a threaded attachment end fitting, at the level of the neck of the gas cylinder, i.e. it is screwed into the fluid inlet/outlet orifice which bears complementary tapping.

The gas distribution valve 3 additionally comprises a gas distribution connector or end fitting, called the delivery outlet connector 11, to which can be connected, for example, a flexible gas duct, such as a pipe made of flexible plastic, used to convey the gas to a medical device or apparatus using the gas delivered by the valve 3, for example a breathing mask delivering gas to a patient at a flow rate prescribed by a doctor or the like corresponding to a treatment to be followed. The valve body is preferably made of brass or of stainless steel.

Additionally, the gas distribution valve 3 comprises either a pressure sensor 4 and a temperature sensor which are distinct from one another, or a single pressure and temperature sensor, for measuring the pressure and/or the temperature of the gas, within the internal gas passage and/or in the internal volume 2 of the container 1, and to deliver pressure measurements (i.e. a numerical value or a signal corresponding to a numerical value) to microprocessor 15-based data processing means 5.

Preferably, a single pressure and temperature sensor 4 is used because this type of sensor allows the overall architecture of the valve to be simplified by decreasing the number of taps or bores needed to take measurements, which also lowers the risk of leaks.

The microprocessor 15-based data processing means 5 are or comprise a data processing unit or device comprising one or more microprocessors implementing one or more algorithms, for example a circuit board bearing one or more microprocessors 15 implementing one or more algorithms, etc., preferably one or more microcontrollers. The data processing means 5 are also called driver means, control electronics or the like.

The microprocessor 15-based data processing means 5 are configured to process the raw pressure and temperature measurements provided by the one or more pressure and temperature sensors. They are preferably arranged in the housing for the electronic device 7, for example a digital manometer, attached to the fluid distribution valve 3, which further comprises a digital display 6, such as an LCD screen or the like, for displaying the remainder or other parameters.

Provision is further made for a device for selecting the flow rate 12 which can be actuated by a user, such as a rotary handwheel, used to select a desired flow rate for the gas that has to be delivered by the delivery outlet connector 11, for example to meet what has been prescribed by a doctor or the like. As illustrated in FIG. 2, the device for selecting the flow rate 12 may be a rotary handwheel that can be rotated between a plurality of angular positions, offset from one another, which each correspond to a given flow rate value, namely typically selectable gas flow rate values of between 0 L/min and 30 L/min, preferably between 0 and 25 L/min.

For example, the selectable flow rate values may be as follows: 0, 0.5, 1, 2, 3, 5, 8, 10, 12, 15, 20, 22 and 25 L/min, or any other value. The desired flow rate value selected by the user by actuating the device for selecting the flow rate 12, i.e. rotary handwheel, appears in a readout window 14 located above the device for selecting the flow rate 12, for example a cutout made in the body 10 of the protective covering 13 arranged around the valve 3 and serving to protect it from impacts or other external stresses.

The device for selecting the flow rate 12 further cooperates with a device for adjusting the flow rate arranged in the body of the valve 3 in order to adjust the flow rate to the desired gas flow rate value, for example the device for adjusting the flow rate may be a calibrated disc with orifices arranged in the path of the gas in the body of the valve 3. Such an arrangement is known per se.

Once the desired gas flow rate has been selected, the position of the device for selecting the flow rate 12, for example the angular position of the rotary handwheel, may be determined by virtue of one or more position sensors. Knowing the angular position of the rotary handwheel then allows the data processing means 5 to know the value of the desired gas flow rate that has been selected.

In the embodiment of FIG. 2, the delivery outlet connector 11 is arranged at the centre of and coaxially with the rotary handwheel for selecting the flow rate 12; however, they could also be separate from one another according to other possible embodiments (not shown).

Additionally, the one or more pressure sensors 4 are configured and arranged to measure the pressure of the gas in the cylinder 1, i.e. the gas from the internal volume 2, and then to deliver the pressure measurements taken to the data processing means 5 (i.e. numerical values or signals corresponding to numerical values), as explained below with reference to FIG. 3.

The pressure (or temperature) measurements taken and transmitted by the one or more pressure and temperature sensors 4 are, for example, signals that represent either raw pressure and/or temperature values or other quantities, such as voltage or current values, corresponding to raw pressure and/or temperature values. These pressure and/or temperature measurements are processed by the data processing means 5 in order to determine the remaining fluid, or other items of information such as the volume of gas in the container 1, the gas pressure in the container 1, etc.

This information can be displayed on the display 6 for a user, typically a caregiver, such as a doctor or a nurse.

Provision is also made for a timer, for example internal to the data processing means 5, in order to allow duration calculations or other time tracking to be carried out.

The internal volume 2 of the container 1 (in water equivalent) is a known value which can be stored by storage means 9 either directly in software implemented by the microprocessor 15 or in a computer memory, of EEPROM type or the like, of the electronic device 7. The computer memory can be arranged on the circuit board bearing the microprocessor 15 and electrically connected thereto. For example, gas cylinders equipped in this way used to deliver medical oxygen (i.e. oxygen of medical quality) typically have internal volumes 2 of between 1 L and 20 L (water equiv.), typically between 2 L and 15 L; for example, depending on the cylinder in question, the volume may be of the order of 2 L, 3.5 L, 4.6 L, 5 L, 7 L, 10 L, 11 L or 15 L.

The storage means 9 may also store other data, such as, for example, the duration elapsed between successive times, pressure and/or temperature measurements, or other parameters, such as the position of the selector, the configuration of the cylinder, the fill pressure, alerts, etc.

More generally, the electronic device 7, for example a digital manometer, which comprises the microprocessor 15-based data processing means 5, such as a circuit board, is accommodated in an opening or compartment provided in the body 10 of the protective covering 13 arranged around the fluid distribution valve 3 and serving to protect it from impacts or other possible damage, for example a rigid covering made of polymer and/or of metal, as illustrated in FIG. 2.

The body 10 of the covering 13 defines a volume or compartment dimensioned to accommodate the gas distribution valve, namely here a valve with an integrated pressure regulator or IPR. It additionally comprises one or more carrying handles 16 arranged here so as to surmount the covering 13, i.e. located substantially on top of the body 10 of the covering 13, and being connected to the body 10 here by two support uprights 17 projecting substantially upwards.

According to one embodiment, the covering body 10 may further comprise a securing system 18 (not completely visible), preferably a pivoting securing means, designed to allow it to be secured to a support, in particular to a bar of a hospital bed or to a stretcher for carrying a patient or the like.

The digital display 6 of the electronic device 7 comprises a digital screen, for example a liquid crystal display (LCD) or the like, borne by the rigid housing, in particular the front face, for the electronic device 7, as illustrated in FIG. 2. It may be displayed in colour or in black and white.

The digital display 6 is supplied with power by an electrical energy source (not visible) arranged in the covering 13, for example one or more batteries or cells placed in a cell compartment made in the wall of the covering body and closed by a removable flap or the like. The electrical power source also serves to supply power to the other components of the electronic device 7 that need electric current to operate, in particular the microprocessor 15-based data processing means 5.

As explained above, the digital display 6 of the electronic device 7 makes it possible to display all of the information of use to the user, such as, for example, pressure and gas volume values, a remainder (in hours and minutes) or other information or data, for example the value of the desired or actual gas flow rate (in L/min or in other units), or the remaining gas (in hours and minutes) may also be represented by a graphic bar. For example, the digital display 6 comprises a screen with a height of, for example, between 29 and 37 mm approximately, and with a width of, for example, between 39 and 43 mm approximately.

The microprocessor 15-based data processing means 5, typically a circuit board, are also configured to control sound alert means and/or visual alert means, preferably both, so as to trigger at least one sound alert and/or visual alert, preferably both, in the event of detection of a malfunction, in particular a restriction, or an amount of gas or remainder that is too low.

According to the invention, the data processing means 5 are configured to more accurately calculate the remaining gas available in the gas cylinder based on successive pressure measurements ($P_1 \ldots P_n$) taken by the means 4 for measuring pressure, typically a pressure sensor.

Figure 3:
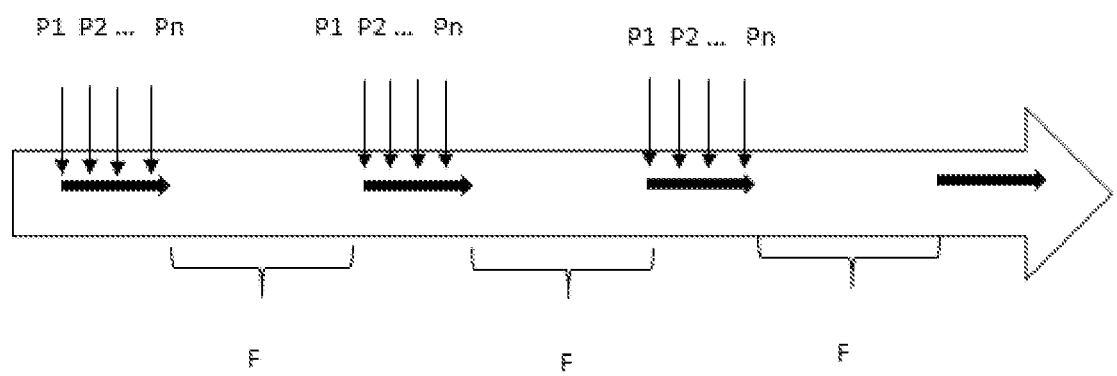

More precisely, as illustrated in FIG. 3, the means 4 for measuring pressure are configured to take, preferably continuously, successive pressure measurements ($P_1 \ldots P_n$) which are repeated over time at a given frequency (F) between 5 and 300 seconds, preferably between 5 and 30 seconds. These pluralities of successive pressure measurements ($P_1 \ldots P_n$) form sets, blocks or groups of pressure measurements, as visible in FIG. 3.

Additionally, the data processing means 5 determine the remaining fluid based on these pressure measurements ($P_1 \ldots P_n$) measured at the given frequency (F).

These successive pressure measurements ($P_1 \ldots P_n$) make it possible to establish a variation in pressure over time, i.e. one or more slopes of the pressure drop over time. It is then these slopes of the pressure drop which allow the remaining fluid to be calculated.

In addition, one or more additional parameters chosen from among the position of the member for selecting the flow rate 12, the temperature of the fluid and the volume of the fluid container is or are used to calculate the remaining fluid even more accurately. This calculation may be performed in a manner known per se.

A container 1 for pressurized fluid, in particular a gas cylinder, according to the invention is particularly well suited for storing and distributing medical oxygen or any other medical gas.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A container for pressurized fluid having a given internal volume, comprising a fluid distribution valve comprising:
   a member for selecting a flow rate able to adopt a plurality of distinct positions each corresponding to a given fluid flow rate between 0 and 30 L/min, said member for selecting the flow rate being able to be manipulated by a user in order to select a desired flow rate,
   and an electronic device comprising:
      a means for measuring pressure in order to measure the pressure of the fluid contained in the fluid container,
      a microprocessor based data processing means for processing at least some of the pressure measurements taken by the means for measuring pressure and calculating a remaining fluid, and
      a display means for displaying the remaining fluid calculated by the data processing means,
   wherein:
      the means for measuring pressure are configured to take a plurality of successive pressure measurements, said successive pressure measurements being repeated at a given frequency between 5 and 300 seconds, these pluralities of successive pressure measurements forming pressure measurement blocks, and the data processing means are configured to determine the remaining fluid by determining at least one pressure variation from said pressure measurement blocks measured by the means for measuring pressure at the given frequency and at least one additional parameter chosen from among the position of the member for selecting the flow rate, the temperature of the fluid and a volume of the fluid container.

2. The container according to claim 1, wherein said successive pressure measurements are repeated at a given frequency between 5 and 30 seconds.

3. The container according to claim 1, wherein said successive pressure measurements are taken continuously.

4. The container according to claim 1, further comprising at least one position sensor configured to determine the position of the member for selecting the flow rate and/or at least one temperature sensor configured to measure the temperature of the fluid.

5. The container according to claim 1, wherein the given volume of the fluid container is stored by the data processing means.

6. The container according to claim 5, wherein the given volume of the fluid container is between 1 L and 20 L.

7. The container according to claim 1, wherein the at least one pressure variation is a pressure drop slope.

8. The container according to claim 1, characterized in that the member for selecting the flow rate comprises a rotary member, and the selectable positions are angularly offset positions.

9. The container according to claim 1, wherein said successive pressure measurements are repeated at a given frequency over a period of time of several days, several weeks, several months or several years.

10. The container according to claim 1, wherein said successive pressure measurements are repeated at a given frequency without interruption, regardless of whether or not the container is in use.

* * * * *